(12) United States Patent
Yang et al.

(10) Patent No.: US 12,321,573 B2
(45) Date of Patent: Jun. 3, 2025

(54) SYSTEM AND METHOD FOR PROCESSING AND PRESENTING POPULARITY DATA

(71) Applicant: Lenovo (Beijing) Limited, Beijing (CN)

(72) Inventors: Hongbo Yang, Beijing (CN); Hong Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/121,516

(22) Filed: Mar. 14, 2023

(65) Prior Publication Data
US 2024/0005342 A1    Jan. 4, 2024

(30) Foreign Application Priority Data

Jun. 30, 2022   (CN) .......................... 202210758862.5

(51) Int. Cl.
*G06F 3/0484*   (2022.01)
*G06F 11/34*   (2006.01)
*G06Q 30/0201*   (2023.01)
*H04L 67/50*   (2022.01)

(52) U.S. Cl.
CPC ........ *G06F 3/0484* (2013.01); *G06F 11/3438* (2013.01); *G06Q 30/0201* (2013.01); *H04L 67/535* (2022.05)

(58) Field of Classification Search
CPC .. H04L 67/535; G06F 3/0484; G06F 11/3438; G06F 3/0481; G06F 9/451; G06F 11/3055; G06F 11/324; G06Q 30/0641; G06Q 30/0201
See application file for complete search history.

(56) References Cited

U.S. PATENT DOCUMENTS

| | | | |
|---|---|---|---|
| 2013/0091417 A1* | 4/2013 | Cordasco | G06F 16/972 715/234 |
| 2014/0068498 A1* | 3/2014 | Olsen | G06F 11/3438 715/781 |
| 2015/0066579 A1* | 3/2015 | de Paris | G06Q 30/0201 705/7.29 |
| 2020/0327031 A1* | 10/2020 | Oh | G06F 11/3438 |

* cited by examiner

*Primary Examiner* — Nicholas Ulrich
(74) *Attorney, Agent, or Firm* — ANOVA LAW GROUP, PLLC

(57) ABSTRACT

A popularity data processing method includes receiving a trigger operation for a target page, obtaining one or more target elements in a display state from one or more elements included in the target page, and obtaining popularity data of the target elements based on the trigger operation. A target element of the one or more target elements is an element in the target page belonging to a first display type or a second display type. The first display type is an element type that enters a display state from a hidden state in response to a received display operation, the second display type being different from the first display type.

17 Claims, 12 Drawing Sheets

Target page

SYSTEM AND METHOD FOR PROCESSING AND PRESENTING POPULARITY DATA

CROSS-REFERENCE TO RELATED APPLICATION

This application claims priority to Chinese Patent Application No. 202210758862.5, filed on Jun. 30, 2022, the entire content of which is incorporated herein by reference.

TECHNICAL FIELD

The present disclosure relates to the information technology field and, more particularly, to a data processing method, a device, and a readable storage medium.

BACKGROUND

A heat map is usually displayed on a top layer of a page to prompt a user with visit popularities of elements on the page. For example, when the user needs to view click popularity of images on the page, the visit popularity of the images that are rendered and displayed on the page during page initialization.

SUMMARY

Embodiments of the present disclosure provide a popularity data processing method. The method includes receiving a trigger operation for a target page, obtaining one or more target elements in a display state from one or more elements included in the target page, and obtaining popularity data of the target elements based on the trigger operation. A target element of the one or more target elements is an element in the target page belonging to a first display type or a second display type. The first display type is an element type that enters a display state from a hidden state in response to a received display operation, the second display type being different from the first display type.

Embodiments of the present disclosure provide a popularity data processing device, including an operation reception unit, an element acquisition unit, and a data acquisition unit. The operation reception unit is configured to receive a trigger operation for a target page. The element acquisition unit is configured to obtain one or more target elements in a display state from one or more elements included in the target page. The target element of the one or more target elements is an element in the target page belonging to a first display type or a second display type. The first display type is an element type that enters a display state from a hidden state in response to a received display operation. The second display type is different from the first display type. The data acquisition unit is configured to obtain popularity data of the target elements based on the trigger operation.

Embodiments of the present disclosure provide an electronic apparatus, including a processor and a memory. The memory stores a computer program and data generated by running the computer program that, when executed by the processor, causes the processor to receive a trigger operation for a target page, obtain one or more target elements in a display state from one or more elements included in the target page, and obtain popularity data of the target elements based on the trigger operation. A target element of the one or more target elements is an element in the target page belonging to a first display type or a second display type. The first display type is an element type that enters a display state from a hidden state in response to a received display operation. The second display type is different from the first display type.

According to the above technical solution, in the popularity data processing method and device, and the electronic apparatus of embodiments of the present disclosure, after the trigger operation is received, the target elements in the display state that belong to the first display type or the second display type are obtained on the target page. The first display type is an element type that enters a display state from a hidden state in response to a received display operation. The second display type is different from the first display type. Based on this, in the present disclosure, the popularity data of the target elements can be obtained based on the trigger operation. Thus, in the present disclosure, the popularity data of the element that is initially in the display state (without the display operation) can be obtained, and the popularity data of the element that is in the display state with the required display operation can be obtained. Therefore, the obtained popularity data is not limited to the element that is initially in the display state, which causes the popularity data of the present disclosure provided to the user to have a higher integrity.

DETAILED DESCRIPTION OF THE EMBODIMENTS

The technical solutions of embodiments of the present disclosure are described in detail below in connection with the accompanying drawings of embodiments of the present disclosure. Described embodiments are only some embodiments of the present disclosure not all embodiments. All other embodiments obtained by those of ordinary skill in the art without creative effort are within the scope of the present disclosure.

Figure 1:
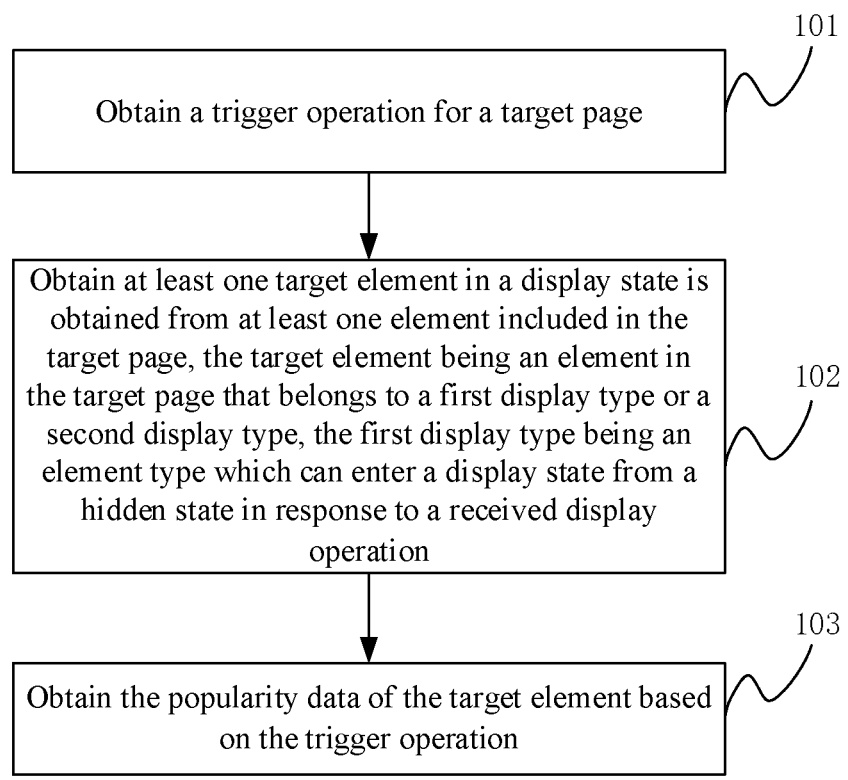
FIG. 1 illustrates a schematic flowchart of a popularity data processing method according to embodiments of the present disclosure.

FIG. 1 illustrates a schematic flowchart of a popularity data processing method according to embodiments of the present disclosure. The method can be applied to an electronic apparatus configured to process a page, such as a cell phone, a tablet computer, or a computer. In the technical solution of embodiments of the present disclosure, popularity data of a page can be obtained. Thus, the popularity data can have higher integrity relative to elements on the page.

In some embodiments, the method includes the following processes.

At 101, a trigger operation for a target page is received.

Figure 2:
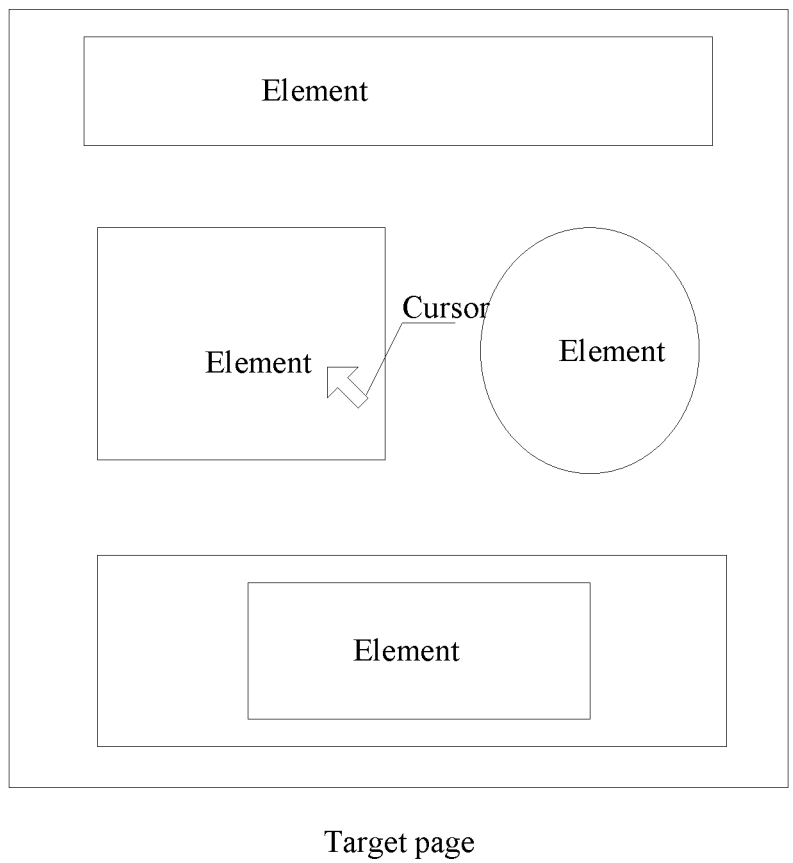
FIG. 2 illustrates a schematic diagram of a page element operation according to embodiments of the present disclosure.

The trigger operation can be an operation of accessing a page element in the target page, such as clicking on the target page by the user. For example, as shown in FIG. 2, the user moves a cursor to one of the image elements and clicks a left button of a mouse. A link to the page element can pop up on the target page, or the image can be enlarged. The operation of clicking on the left button of the mouse can be the trigger operation for the page element on the target page.

At 102, at least one target element in a display state is obtained from at least one element included in the target page.

The target element can be an element in the target page that belongs to a first display type or a second display type. The first display type can be an element type that enters a display state from a hidden state in response to a received display operation. The second display type can be different from the first display type. The second display type can be an element type which is in the display state after the page is initialized without receiving the display operation.

That is, in some embodiments, any element in the display state on the target page can be used as a target element. The target element is not limited to an element in the display state in the page initialization.

In some embodiments, the target element in the display state can be filtered by traversing a display attribute of each element on the target page. The display attribute can be obtained by parsing rendering data. For example, if a width and a height in the element rendering data are 0, the element can be indicated to be in the display state. For another example, if the display attribute of the element represents being rendered, the element can be indicated to be in the display state.

At 103, the popularity data of the target element is obtained based on the trigger operation.

In some embodiments, popularity data of buried data of a target element can be extracted to obtain popularity data of each target element. Based on this, latest popularity data of the target elements can be obtained as the user performs a plurality of operations on the target page.

According to the above technical solution, in the popularity data processing method of embodiments of the present disclosure, the trigger operation for the target page is received, the target element that belongs to the first display type or the second display type and is in the display state can be obtained from the target page. The first display type can be an element type in which the target element can enter the display state from the hidden state in response to receiving the display operation. The second display type can be different from the first display type. Based on this, in the present disclosure, the popularity data of the target element can be obtained based on the trigger operation. In some embodiments, the popularity data of the element of the page that is initially in the display state (without the display operation) can be obtained, and the popularity data of the element that is in the display state through the display operation can be obtained. Thus, the obtained popularity data is not limited to the element of the page that is initially in the display state. Thus, the popularity data provided to the user can have higher integrity relative to the elements on the page.

Figure 3:
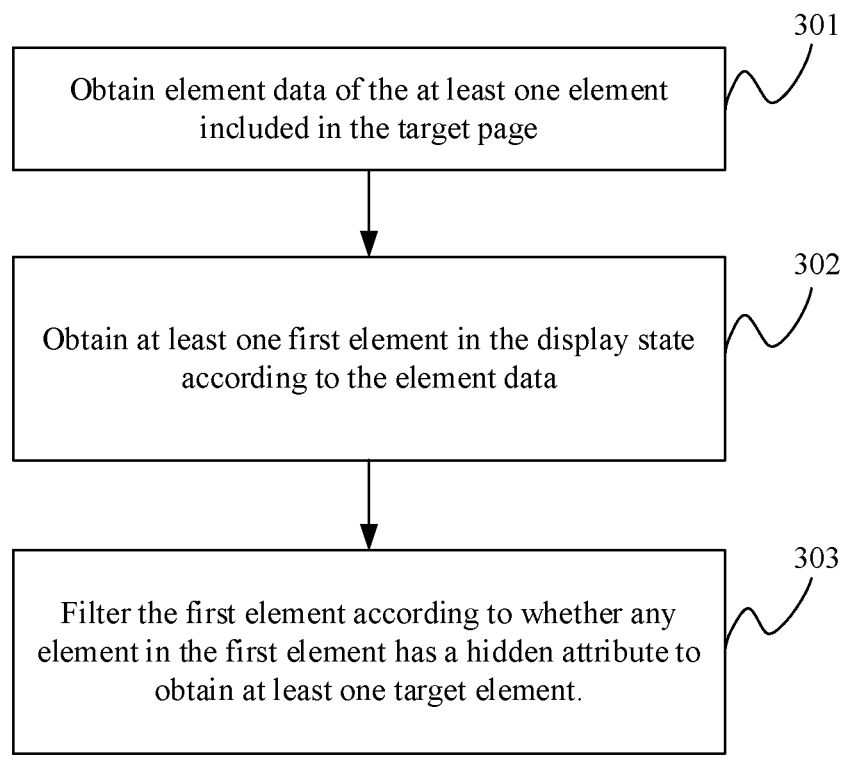
FIG. 3 illustrates a schematic flowchart of a part of a popularity data processing method according to embodiments of the present disclosure.

In some embodiments, as shown in FIG. 3, in process 102, obtaining the at least one target element in the display state includes the following processes.

At 301, element data of the at least one element included in the target page is obtained.

The element data can include a width offsetWidth of an area to which the element belongs in the page, a height offsetHeight of the area to which the element belongs in the page, an abscissa offsetLeft of a vertex of the area to which the element belongs in the page, an ordinate offsetTop of the area to which the element belongs in the page, a width of the element, a height of the element, a rendering attribute display of the element, and a number of times that the element is selected.

In some embodiments, at least one buried point can be set for the target page in advance. Each buried point can correspond to one element on the target page. Based on this, in some embodiments, when the element data is obtained, buried data of the at least one buried point can be obtained on the target page. Then, element data of an element corresponding to the buried point can be obtained on the target page according to the buried data.

At 302, at least one first element in the display state is obtained according to the element data.

In some embodiments, the rendering attribute of the element data can be parsed according to the element data to determine whether each element on the target page is in the display state. Thus, the at least one first element in the display state can be obtained on the target page.

At 303, the first element is filtered according to whether any element in the first element has a hidden attribute to obtain at least one target element.

The hidden attribute can represent that the element to which the hidden attribute belongs can enter the display state from the hidden state in response to receiving the display operation.

In some embodiments, when the first element includes the hidden attribute, the element of the first element with the hidden attribute can be determined as the target element. Thus, in process 103, the obtained popularity data can be the popularity data of the target element of the first display type.

When no first element includes the hidden attribute, the first element can be determined as the target element. Thus, in process 103, the obtained popularity data can be the popularity data of the target element of the second display type.

Thus, in some embodiments, the elements of the target page in the display state can be divided into layers. An element with the hidden attribute can be listed as an element with a higher priority. Thus, if an element of the first element in the display state includes the hidden attribute, the popularity data of the element that includes the hidden attribute and is in the display state can be obtained. If no element of the first element in the display state includes the hidden attribute, the popularity data of the element that does not include the hidden attribute and is in the display state can be obtained.

Figure 4:
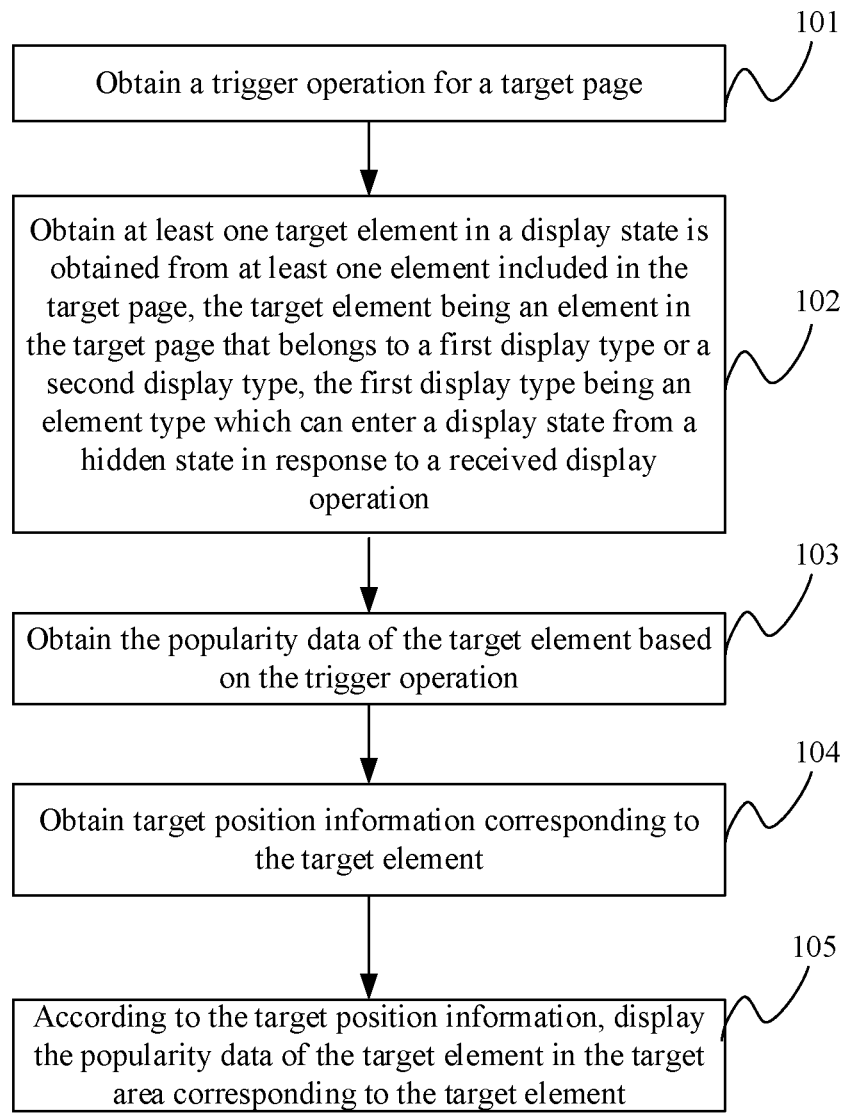
FIG. 4 illustrates a schematic flowchart of another popularity data processing method according to embodiments of the present disclosure.

In some embodiments, as shown in FIG. 4, after process 103, the method further includes the following processes.

At 104, target position information corresponding to the target element is obtained.

The target position information can be used to display the popularity data of the target element. The target position information can be represented by the element position information of the target element or by the element position information of an ancestor element of the target element. The target position information of the target element can be element position information of the target element relative to a coordinate of a vertex of the target page.

In some embodiments, the element position information of the target element can be obtained first. That is, the element position information of the target element can be obtained. Then, the element position information of the target element can be compared with the element position of the ancestor element of the target element. When the element position information of the target element matches the element position information of the ancestor element of the target element, the element position information of the target element can be used as the target position information corresponding to the target element. When the element position information of the target element does not match the element position information of the ancestor element of the target element, the element position information of the ancestor element can be used as the target position information corresponding to the target element.

In some embodiments, the element coordinate information of the target element can be first obtained according to the element data of the target element. The element coordinate information of the target element can correspond to an element coordinate system of the target element. In the element coordinate system of the target element, a vertex of an area to which the target element belongs can be used as a coordinate origin. Then, when the target element has a parent element, that is, the target element has a parent node on the target page, the element coordinate information of the target element can be adjusted according to the element coordinate information of the parent element. For example, offsetLeft and offsetTop of the target element can be added to offsetLeft and offsetTop of the parent element, respectively, to obtain the element coordinate information of the target element. Then, according to the element coordinate information of the target element, the element position information of the target element can be obtained. the element position information of the target element can correspond to the page coordinate system of the target page. In the page coordinate system of the target page, a vertex of the target page can be used as the coordinate origin. For example, the element coordinate information of the target element can be used to represent the element position information of the target element.

The ancestor element of the target element can be parent node element offsetParent of the target element at a top level on the target page. The element position information can be represented by an abscissa offsetLeft of the vertex of the area to which the element belongs in the page and an ordinate offsetTop of the vertex of the area to which the element belongs in the page.

In some embodiments, offsetLeft and offsetTop of offsetParent can be searched cyclically and continuously upward, and summation can be performed on offsetLeft and offsetTop until the ancestor element is found. OffsetWidth and offsetHeight of the ancestor element can be obtained. offsetWidth and offsetHeight of the target element can be compared to offsetWidth and offsetHeight of the ancestor element. If the offsetWidth and offsetHeight of the ancestor element exceed a visible area corresponding to the target element, that is, the offsetWidth of the ancestor element can be larger than offsetWidth of the target element, or offsetHeight of the ancestor element can be larger than offsetHeight of the target element, the element position information of the ancestor element can be used as the target position information corresponding to the target element. For example, a width of a carousel area based on transform can be larger than widths of carousel images. The element position information of the carousel area can be used as the element position information of the carousel images.

Figure 5A:
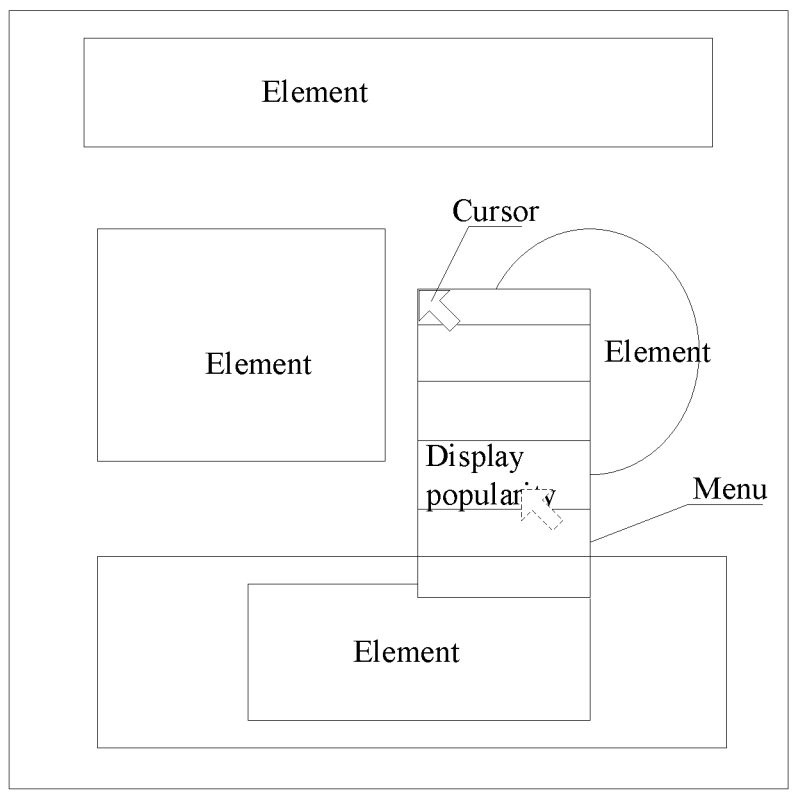
FIG. 5A illustrates a schematic diagram showing displaying a page popularity according to embodiments of the present disclosure.

Process 104 can be performed after the display instruction is received. The display instruction can be used to indicate the popularity data of the element in the output target page. For example, as shown in FIG. 5a, the user clicks a right mouse button, and a pop-up menu pops up on the target page. The pop-up menu includes a control element of "display popularity". The user can click on the control element of "display popularity" to generate the display instruction. Then, in embodiments of the present disclosure, process 104 can be performed.

At 105, according to the target position information, the popularity data of the target element is displayed in the target area corresponding to the target element.

Figure 5B:
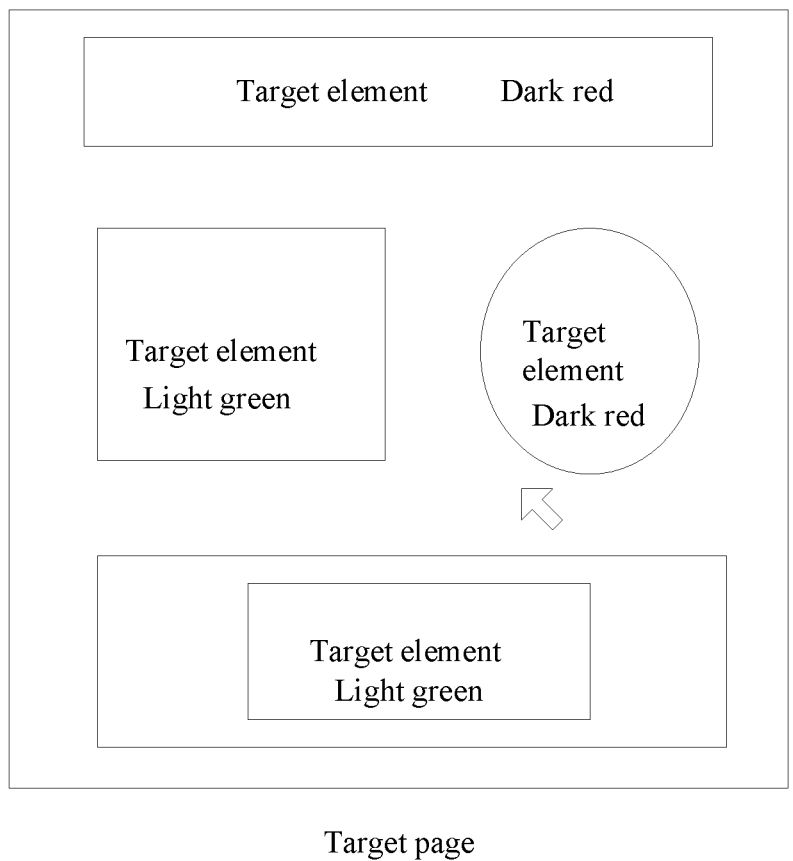
FIG. 5B illustrates a schematic diagram showing outputting a page popularity according to embodiments of the present disclosure.

For example, as shown in FIG. 5B, the area represented by offsetLeft, offsetTop, offsetWidth, and offsetHeight of the target element can be determined as the display area according to the target position information of the target element. A daily click rate of the target element can be displayed in the display area to represent the daily popularity of the target element. That is, a popularity diagram can be displayed.

In some embodiments, the popularity data of the target element can be further represented by different pixel values. For example, in FIG. 5B, a target element with a higher daily click rate is indicated by dark red, and a target element with a lower daily click rate is indicated by light green.

Figure 6:
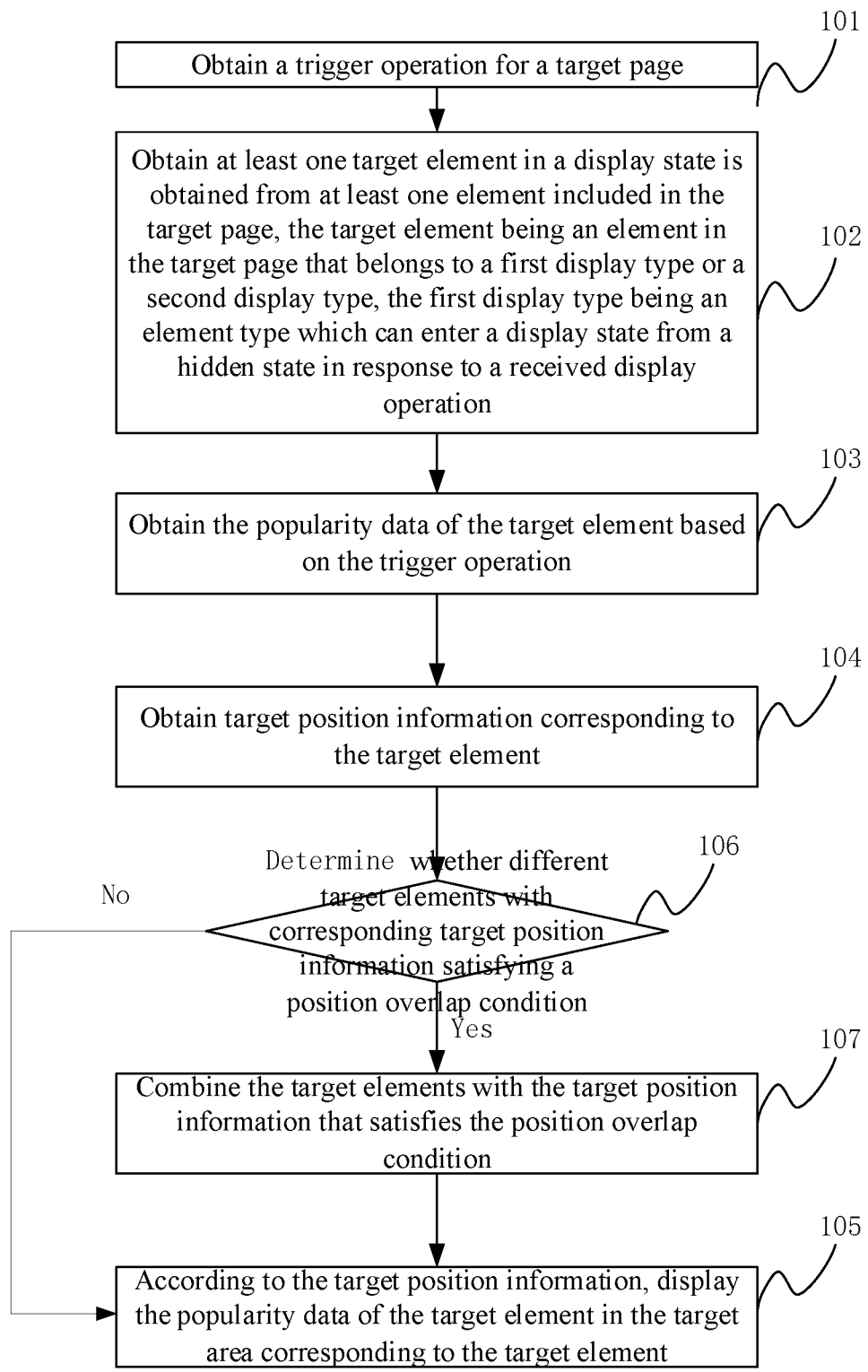
FIG. 6 illustrates a schematic flowchart of another popularity data processing method according to embodiments of the present disclosure.

Further, in some embodiments, as shown in FIG. 6, after obtaining the target position information corresponding to the target element, and before process 105, the following process is performed.

At 106, whether different target elements with corresponding target position information satisfying a position overlap condition exist is determined. If different target elements with the corresponding target position information satisfying the position overlap condition exist, process 107 is performed. Otherwise, process 105 is performed.

Figure 7:
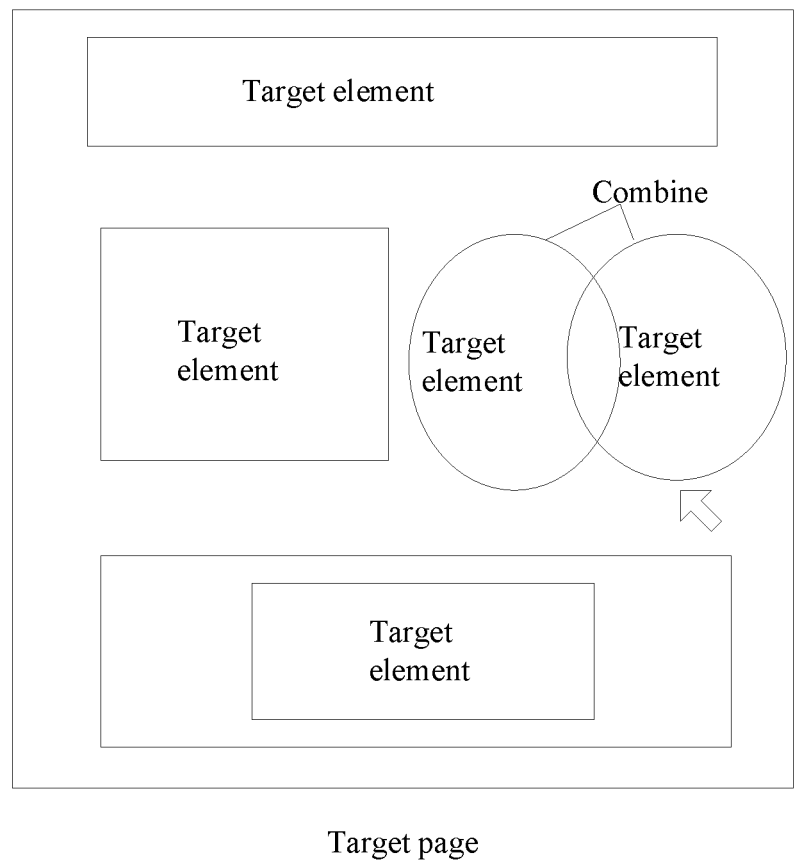
FIGS. 7 and 8 illustrate schematic diagrams of combined elements according to embodiments of the present disclosure.

The position overlap condition can include that coordinates or areas of different target elements can overlap. For example, as shown in FIG. 7, at least partial overlap exists between the target elements through the area represented by offsetLeft, offsetTop, offsetWidth, and offsetHeight. If the target position information corresponding to different target elements satisfies the position overlap condition, process 107 can be performed.

At 107, the target elements with the target position information that satisfy the position overlap condition are combined. Then, process 105 is performed.

Figure 8:
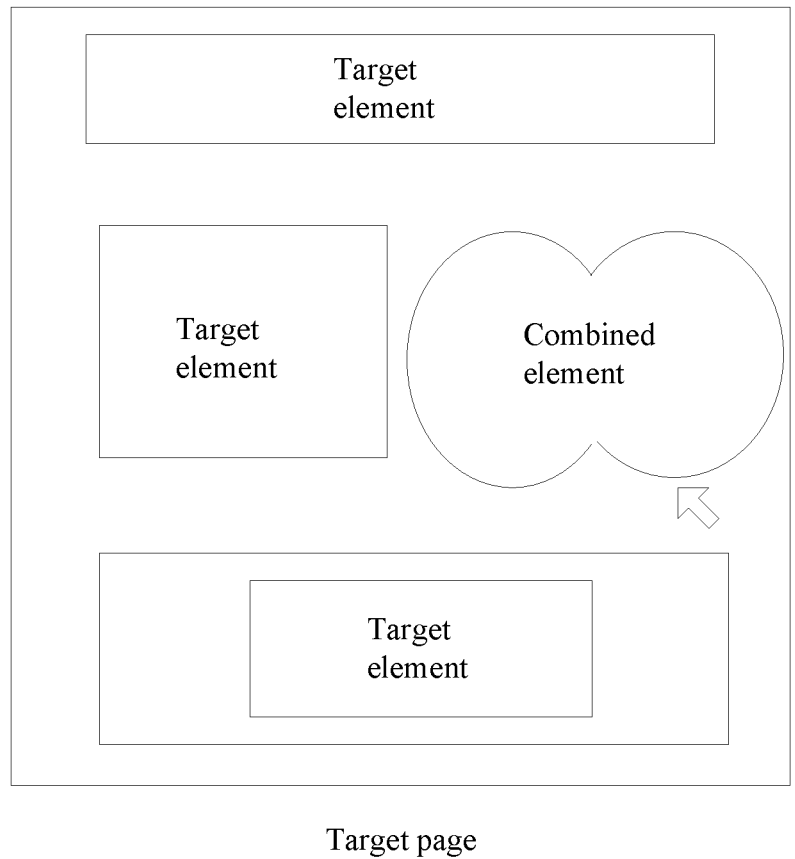

For example, as shown in FIG. 8, the target elements are partially overlapped, and areas in which the target elements are located are combined to obtain a combined element. Target position information corresponding to the combined element can be obtained according to the target position information corresponding to the plurality of combined target elements. Moreover, the popularity data corresponding to the combined element can be a sum of the popularity data of the plurality of combined target elements. Correspondingly, the area where the combined element is located can be an area obtained by combining the areas where the plurality of combined target elements is located.

Figure 9:
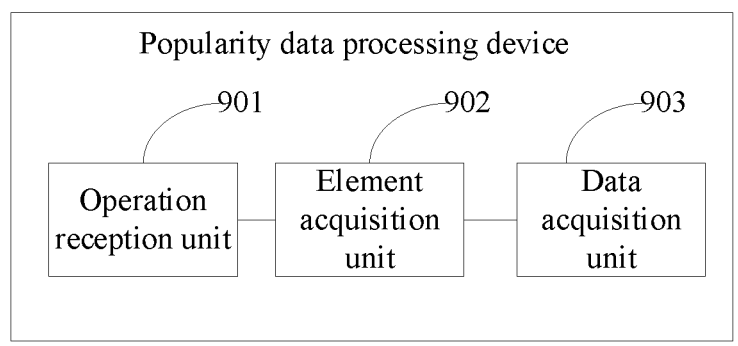
FIG. 9 illustrates a schematic structural diagram of a popularity data processing device according to embodiments of the present disclosure.

FIG. 9 illustrates a schematic structural diagram of a popularity data processing device according to embodiments of the present disclosure. The device can be arranged in an electronic apparatus that is capable of processing the page, such as a cell phone, a tablet computer, or a computer. In the technical solution of embodiments of the present disclosure, the popularity data of the element on the page can be obtained. Thus, the popularity data provided for the user can have higher integrity relative to the elements on the page.

In some embodiments, the device includes an operation reception unit 901, an element acquisition unit 902, and a data acquisition unit 903.

The operation reception unit 901 can be configured to receive a trigger operation for a target page.

The element acquisition unit 902 can be configured to obtain at least one target element that is in the display state from the at least one element included in the target page.

The target element can be an element of the target page that belongs to a first display type or a second display type. The first display type can be an element type that enters a display state from a hidden state in response to a received display operation. The second display type can be different from the first display type. The second display type can be an element type which is in the display state after the page is initialized without receiving the display operation.

The data acquisition unit 903 can be configured to obtain the popularity data of the target element based on the trigger operation.

According to the above technical solution, in the popularity data processing device of embodiments of the present disclosure, after the trigger operation for the target page is received, the target element that belongs to the first display type or the second display type and is in the display state can be obtained from the target page. The first display type can be an element type in which the target element can enter the display state from the hidden state in response to receiving the display operation. The second display type can be different from the first display type. Based on this, in the present disclosure, the popularity data of the target element can be obtained based on the trigger operation. In some embodiments, the popularity data of the element of the page that is initially in the display state (without the display operation) can be obtained, and the popularity data of the element that is in the display state through the display operation can be obtained. Thus, the obtained popularity data is not limited to the element of the page that is initially in the display state. Thus, the popularity data provided to the user can have higher integrity relative to the elements on the page.

In some embodiments, the element acquisition unit 902 can be configured to obtain element data of the at least one element included in the target page, obtain at least one first element that is in the display state according to the element data, and filter the first elements according to whether any element of the first elements has a hidden attribute to obtain the at least one target element. The hidden attribute can represent that the element to which the hidden attribute belongs can change from the hidden state to the display state in response to receiving the display operation.

In some embodiments, when filtering the first elements according to whether any element in the first element has the hidden attribute, the element obtaining unit 902 can be configured to determine an element that has the hidden attribute of the first elements as the target element when the first element has the hidden attribute, and determine the first elements as the target elements when the first elements do not have the hidden attribute.

In some embodiments, when obtaining the element data of the at least one element included in the target page, the element acquisition unit 902 can be configured to obtain buried data of at least one buried point of the target page, and obtain the element data of the element of the target page corresponding to the buried point.

Figure 10:
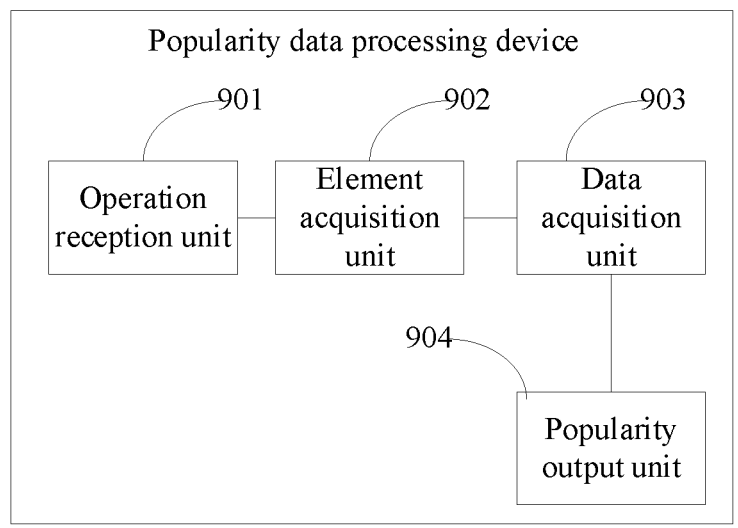
FIG. 10 illustrates a schematic structural diagram of another popularity data processing device according to embodiments of the present disclosure.

In some embodiments, as shown in FIG. 10, the device further includes a popularity output unit 904.

The popularity output unit 904 can be configured to obtain the target position information corresponding to the target element after the data obtaining unit 903 obtains the popularity data of the target element and display the popularity data of the target element in the target area corresponding to the target element according to the target position information.

In some embodiments, when obtaining the target position information corresponding to the target element, the popularity output unit 904 can be configured to obtain the element position information of the target element, use the element position information of the target element as the target position information corresponding to the target element when the element position information of the target element matches the element position information of the ancestor element of the target element, and use the element position information of the ancestor element as the target position information corresponding to the target element when the element position information of the target element does not match the element position information of the ancestor element of the target element.

In some embodiments, when obtaining the element position information of the target element, the popularity output unit 904 can be configured to obtain the element coordinate information of the target element according to the element data of the target element. The element coordinate information of the target element can correspond to the element coordinate system of the target element. The popularity output unit 904 can be further configured to, when the target element has the parent element, adjust the element coordinate information of the target element according to the element coordinate information of the parent element, and obtain the element position information of the target element according to the element coordinate information of the target element. The element position information of the target element can correspond to the page coordinate system of the target page.

Further, after obtaining the target position information corresponding to the target element, the popularity output unit 904 can be configured to first determine whether different target elements with corresponding target position information satisfying the position overlap condition exist, if different target elements with corresponding target position information satisfying the position overlap condition exist, combine the target elements with the target position information satisfying the position overlap condition, and display the popularity data of the target elements in the target area corresponding to the target elements according to the target position information.

For a specific implementation of each unit, reference can be made to the corresponding content above, which is not repeated here.

Figure 11:
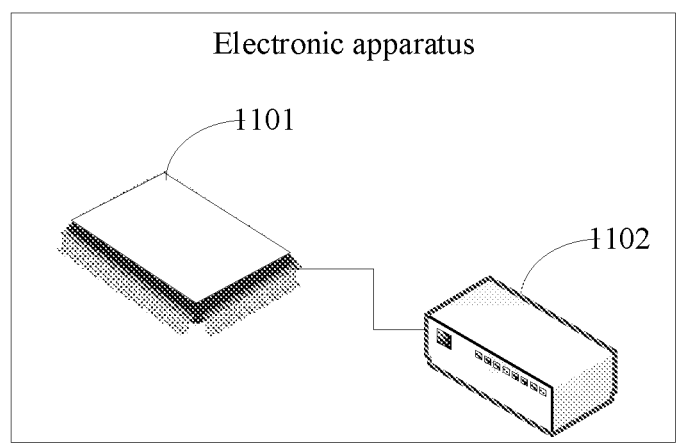
FIG. 11 illustrates a schematic structural diagram of an electronic apparatus according to embodiments of the present disclosure.

FIG. 11 illustrates a schematic structural diagram of an electronic apparatus according to embodiments of the present disclosure. The electronic apparatus includes a memory 1101 and a processor 1102.

The memory 1101 can be used to store a computer program and data generated by running the computer program.

The processor 1102 can be configured to execute the computer program to receive a trigger operation for a target page and obtain at least one target element that is in the display state from the at least one element included in the target page.

The target element can be an element of the target page that belongs to a first display type or a second display type. The first display type can be an element type that enters a display state from a hidden state in response to a received display operation. The second display type can be different from the first display type. The second display type can be an element type which is in the display state after the page is initialized without receiving the display operation.

The processor 1102 can be further configured to obtain the popularity data of the target element based on the trigger operation.

According to the above technical solution, in the electronic apparatus of embodiments of the present disclosure, after the trigger operation for the target page is received, the target element that belongs to the first display type or the second display type and is in the display state can be obtained from the target page. The first display type can be an element type in which the target element can enter the display state from the hidden state in response to receiving the display operation. The second display type can be different from the first display type. Based on this, in the present disclosure, the popularity data of the target element can be obtained based on the trigger operation. In some embodiments, the popularity data of the element of the page that is initially in the display state (without the display operation) can be obtained, and the popularity data of the element that is in the display state through the display operation can be obtained. Thus, the obtained popularity data is not limited to the element of the page that is initially in the display state. Thus, the popularity data provided to the user can have higher integrity relative to the elements on the page.

Taking a browser page of a cell phone or a computer as an example, the popularity diagram drawing solution can be provided based on a single page or single page complex application interaction. The solution can include the following parts.
1. Page buried point and data layer. Buried point element data that is obtained on the page is divided into buried data of the element directly rendered by the page by default and buried data of the element that is able to be displayed with required interaction.
2. Position acquisition. A position coordinate box model of buried point elements is calculated.
3. Interaction model. An interaction method is created to represent and hide the buried data of the page element that is able to be displayed with the required interaction.

Based on the above solution, the buried popularity data of the elements of the complex interactive page can be outputted, and the popularity diagram can be ensured to be visible and easy to read. The specific solution is described below.

First, in the present disclosure, all buried data obtained from a certain page can be mapped to corresponding elements on the page. Then, the elements can be divided into layers.

A layer division method can include determining whether the element is rendered by default by calculating related features of the element, such as offsetWidth, offsetHeight, width, height, display (the rendered element may not be seen on the page). Thus, all nodes can be divided into two types. A first type node can be an element node that is represented by default or rendered. A second type node can be a hidden element node. After an interaction operation (the display operation) is received, the second type element node can be switched from the hidden state to the display state after being rendered.

For the first type node, offsetLeft and offsetTop of the first type node can be directly obtained in the present disclosure. offsetLeft and offsetTop of offsetParent node of the first type node can be continuously searched cyclically, and summation can be performed to obtain the coordinate of the first type node in the page. An exception may need to be processed separately. That is, when a width or height of a container of a certain offsetParent node is greater than the visual area of the offsetParent node, if a child element of the offsetParent node has a buried point, a final coordinate (e.g., the carousel image based on the transform) can be calculated according to the parent node in the present disclosure. The popularity diagram of the first type node can be displayed on the page by default.

Figure 12:
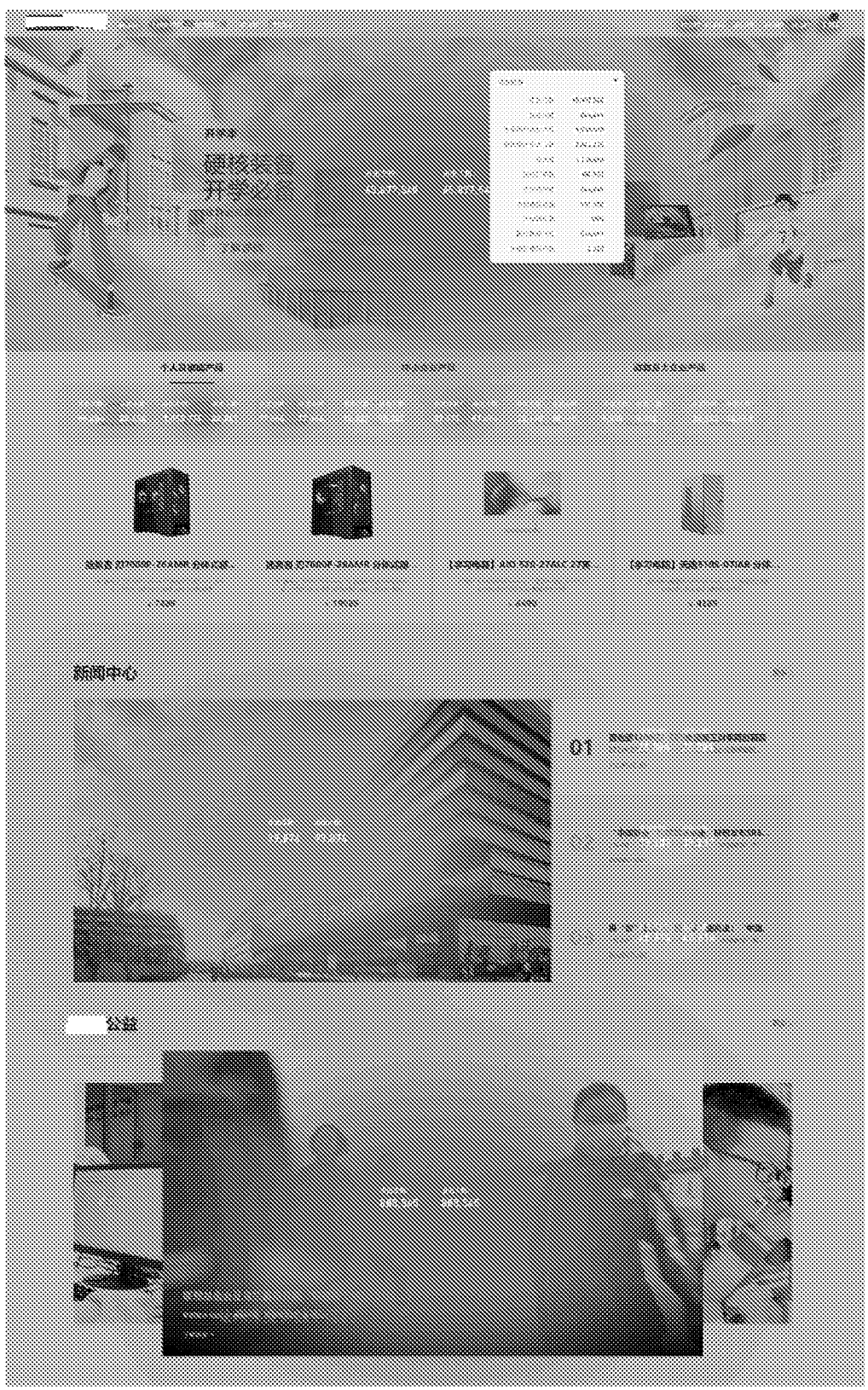
FIGS. 12 and 13 illustrate diagrams showing outputting a browser page popularity according to embodiments of the present disclosure.
Figure 13:
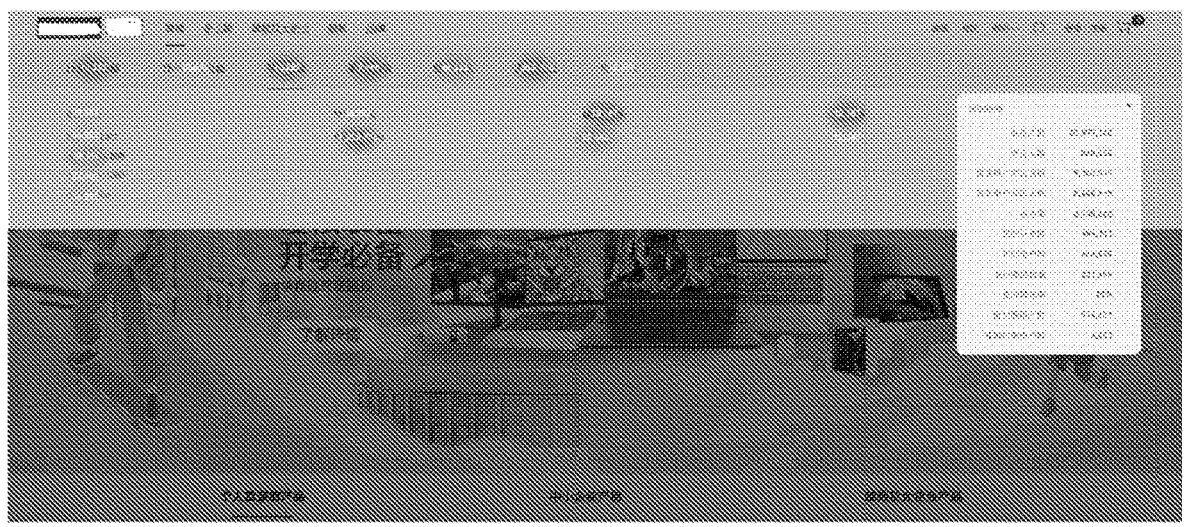

The second type node can only be displayed when the page has interaction, and the popularity diagrams of the first type node can be displayed on the page by default. As shown in FIG. 12, the popularities corresponding to the elements are represented by red, light green, brown, and orange. A number of clicks is also displayed. Thus, in the present disclosure, the interactive model can be created to display and hide the popularity diagram of the current page state. The interactive behavior can include a keyboard event or a mouse event, which can be user-defined. By default, ALT+I can represent of displaying the popularity diagram. ESC can represent the hidden popularity diagram. In the interactive model, when the user wants to see the buried point element that is able to be displayed only with the interaction, the popularity diagram of the current state can be turned off (ESC key). Then, a corresponding area can be interactively triggered on the original page for display. Then, the popularity diagram of the currently interactive buried element can be displayed through ALT+I. As shown in FIG. 13, the popularities corresponding to the elements that are triggered to be displayed through the interaction are represented by red, light green, brown, and orange, and the number of clicks can also be displayed.

Since the second type node belongs to a set of all hidden nodes after the second type node is displayed through the interaction, an element with an element state change can be searched from the second type nodes. Then, the coordinate can be obtained through a getCoundingClientRect method of the node and pageXOffset and pageYOffset of a window. Then, the popularity diagram of the corresponding area can be drawn. In the present disclosure, a common parent element corresponding to the nodes can be found to prevent the display state from being disrupted. In the present disclosure, the nodes can be maintained at the display state all the time.

Therefore, In the solution of the present disclosure, data-buried points can be added to the related element of the page to divide the data-buried points into layers. The interactive model can be created to solve the problem that the complex page (web page) cannot completely display the information related to the buried points to help the operator to understand the operation behavior of the user, which provides help for a market operation and sales person to better optimize the product and experience.

Embodiments in the present disclosure are described in a progressive manner. Each embodiment focuses on differences from other embodiments. The same and similar parts among the embodiments can refer to each other. Since the device of embodiments of the present disclosure corresponds to the method of embodiments of the present disclosure, the description can be simple, For the relevant place, reference can be made to the description of the method.

Those skilled in the art can further understand that the units and algorithm steps of embodiments of the present disclosure can be implemented by electronic hardware, computer software, and a combination thereof. To describe the interchangeability of the hardware and the software, the composition and the steps of embodiments of the present disclosure are generally described according to the functions. Whether the functions are implemented as hardware or software depends on a specific application and design constraints of the technical solution. Those skilled in the art can use different methods to implement the described functions for each specific application. However, such an application should not be considered as exceeding the scope of the present disclosure.

The steps of the method or algorithm described in connection with embodiments of the present disclosure can be directly implemented by hardware, a software module executed by a processor, or a combination thereof. The software module can be stored in random access memory (RAM), memory, read-only memory (ROM), electrically programmable ROM, electrically erasable programmable ROM, registers, hard disk, a removable disk, a CD-ROM, or any other form of storage medium.

The above description of embodiments of the present disclosure can enable those skilled in the art to make or use the present disclosure. Various modifications to embodiments of the present disclosure can be apparent to those skilled in the art. The generic principles defined here can be implemented in other embodiments without departing from the spirit or scope of the present disclosure. Thus, the present disclosure is not limited to the embodiments of the present specification but needs to conform to the widest scope of the principle and the novel feature of the present disclosure.

What is claimed is:

1. A popularity data processing method comprising:
    receiving a trigger operation for a target page;
    obtaining one or more elements included in the target page, filtering the one or more elements according to whether it has a hidden attribute, the hidden attribute representing that an element to which a hidden attribute belongs enters a display state from a hidden state in response to a received display operation; and
    obtaining, based on the filtering, one or more target elements in the display state from the hidden state in response to a received display operation; wherein:
        each of the one or more target elements is an element in the target page belonging to a first display type; and
        the first display type is an element type that enters the display state from the hidden state in response to a received display operation; and
    obtaining popularity data of the one or more target elements based on the trigger operation.

2. The method of claim 1, wherein obtaining, based on the filtering, the one or more target elements in the display state from the one or more elements included in the target page includes:
    obtaining element data of the one or more elements included in the target page; and
    determining whether each of the one or more elements is in the display state according to the element data.

3. The method of claim 2, wherein obtaining the element data of the one or more elements included in the target page includes:
    obtaining buried data of one or more buried points in the target page; and
    obtaining the element data of the one or more elements corresponding to the buried points in the target page according to the buried data.

4. The method of claim 1 further comprising, after obtaining the popularity data of the one or more target elements:
    obtaining target position information corresponding to each of the one or more target elements, and
    displaying the popularity data of the one or more target elements in a target area corresponding to the one or more target elements according to the target position information corresponding to the one or more target elements.

5. The method of claim 4, wherein obtaining the target position information corresponding to each of the one or more target elements includes:
    obtaining element position information of each of the one or more target elements;
    using the element position information of each of the one or more target elements as the target position information corresponding to each of the one or more target elements in response to the element position information matching element position information of an ancestor element of each of the one or more target elements; and
    using the element position information of the ancestor element as the target position information corresponding to each of the one or more target elements in response to the element position information not matching the element position information of the ancestor element of each of the one or more target elements.

6. The method of claim 5, wherein obtaining the element position information of each of the one or more target elements includes:
    obtaining element coordinate information of each of the one or more target elements according to element data of each of the one or more target elements, the element coordinate information corresponding to an element coordinate system;
    in response to any of the one or more target elements having a parent element, adjusting the element coordinate information of the target element according to element coordinate information of the parent element; and
    obtaining the element position information of each of the one or more target elements according to the element coordinate information of each of the one or more target elements, the element position information corresponding to a page coordinate system of the target page.

7. The method of claim 5, further comprising, after obtaining the target position information corresponding to each of the one or more target elements:
    determining whether target position information corresponding to different target elements satisfy a position overlap condition; and
    in response to the target position information corresponding to the different target elements satisfying the position overlap condition, combining the different target elements with the target position information satisfying the position overlap condition.

8. A popularity data processing device, comprising:
an operation reception unit configured to receive a trigger operation for a target page including one or more elements;
an element acquisition unit configured to obtain one or more target elements in a display state from the one or more elements included in the target page, and filter the one or more target elements according to whether it has a hidden attribute, the hidden attribute representing that an element to which a hidden attribute belongs enters the display state from a hidden state in response to the received display operation;
wherein:
each of the one or more target elements is an element in the target page belonging to a first display type; and
the first display type is an element type that enters the display state from the hidden state in response to a received display operation; and
a data acquisition unit configured to obtain popularity data of the one or more target elements based on the trigger operation.

9. The device of claim 8, wherein the element acquisition unit is further configured to:
obtain element data of the one or more elements included in the target page; and
determine whether each of the one or more elements is in the display state according to the element data.

10. The device of claim 9, wherein the element acquisition unit is further configured to:
obtain buried data of one or more buried points in the target page; and
obtain the element data of the one or more elements corresponding to the buried points in the target page according to the buried data.

11. An electronic apparatus, comprising:
a processor; and
a memory storing a computer program and data generated by running the computer program that, when executed by the processor, causes the processor to:
receive a trigger operation for a target page including one or more elements;
obtain one or more target elements in a display state from the one or more elements included in the target page by filtering the one or more target elements according to whether it has a hidden attribute, the hidden attribute representing that an element to which the hidden attribute belongs enters a display state from a hidden state in response to a received display operation;
wherein:
each of the one or more target elements is an element in the target page belonging to a first display type; and
the first display type is an element type that enters the display state from the hidden state in response to a received display operation; and
obtain popularity data of the one or more target elements based on the trigger operation.

12. The apparatus of claim 11, wherein the processor is further configured to:
obtain element data of the one or more elements included in the target page;
determine whether each of the one or more elements is in the display state according to the element data.

13. The apparatus of claim 12, wherein the processor is further configured to:
obtain buried data of one or more buried points in the target page; and
obtain the element data of the one or more elements corresponding to the buried points in the target page according to the buried data.

14. The apparatus of claim 11, wherein, after obtaining the popularity data of the one or more target elements, the processor is further configured to:
obtain target position information corresponding to each of the one or more target elements, and
display the popularity data of the one or more target elements in a target area corresponding to the one or more target elements according to the target position information corresponding to the one or more target elements.

15. The apparatus of claim 14, wherein the processor is further configured to:
obtain element position information of each of the one or more target elements;
use the element position information of each of the one or more target elements as the target position information corresponding to each of the one or more target elements in response to the element position information matching element position information of an ancestor element of each of the one or more target elements; and
use the element position information of the ancestor element as the target position information corresponding to each of the one or more target elements in response to the element position information not matching the element position information of the ancestor element of each of the one or more target elements.

16. The apparatus of claim 15, wherein the processor is further configured to:
obtain element coordinate information of each of the one or more target elements according to element data of each of the one or more target elements, the element coordinate information corresponding to an element coordinate system;
in response to any of the one or more target elements having a parent element, adjust the element coordinate information of the target element according to element coordinate information of the parent element; and
obtain the element position information of each of the one or more target elements according to the element coordinate information of each of the one or more target elements, the element position information corresponding to a page coordinate system of the target page.

17. The apparatus of claim 15, wherein the processor is further configured to:
determine whether target position information corresponding to different target elements satisfy a position overlap condition; and
in response to the target position information corresponding to the different target elements satisfying the position overlap condition, combine the different target elements with the target position information satisfying the position overlap condition.

* * * * *